(12) United States Patent
Van Avermaete

(10) Patent No.: US 8,997,700 B2
(45) Date of Patent: Apr. 7, 2015

(54) INTERNAL COMBUSTION ENGINE WITH VARIABLY TIMED TRANSMISSION

(71) Applicant: Gilbert Van Avermaete, Hellange (LU)

(72) Inventor: Gilbert Van Avermaete, Hellange (LU)

( * ) Notice: Subject to any disclaimer, the term of this patent is extended or adjusted under 35 U.S.C. 154(b) by 0 days.

(21) Appl. No.: 14/136,960

(22) Filed: Dec. 20, 2013

(65) Prior Publication Data

US 2014/0137843 A1    May 22, 2014

Related U.S. Application Data

(63) Continuation-in-part of application No. PCT/IB2012/001193, filed on Jun. 15, 2012.

(30) Foreign Application Priority Data

Jun. 24, 2011  (LU) .......................................... 91831

(51) Int. Cl.
| | |
|---|---|
| *F02B 75/22* | (2006.01) |
| *F16C 3/14* | (2006.01) |
| *F01M 11/02* | (2006.01) |
| *F02B 75/04* | (2006.01) |
| *F16C 33/66* | (2006.01) |

(52) U.S. Cl.
CPC ................. *F02B 75/225* (2013.01); *F16C 3/14* (2013.01); *F01M 11/02* (2013.01); *F02B 75/04* (2013.01); *F16C 33/6677* (2013.01); *F02B 75/228* (2013.01)

(58) Field of Classification Search
CPC ....... F01M 11/02; F02B 75/22; F02B 75/225; F02B 75/04; F16B 3/10; F16B 33/06
USPC .... 123/48 B, 48 D, 51 R, 51 A, 51 AA, 78 R, 123/78 D, 78 E, 78 F, 197, 196 R
See application file for complete search history.

(56) References Cited

U.S. PATENT DOCUMENTS

| | | | | |
|---|---|---|---|---|
| 2,137,941 | A | * 11/1938 | Helmore et al. | ............. 123/51 R |
| RE24,214 | E | * 9/1956 | Hittell | .......................... 123/48 B |
| 3,961,607 | A | * 6/1976 | Brems | ........................ 123/78 R |
| 4,194,797 | A | * 3/1980 | Hormann et al. | ............ 384/467 |

(Continued)

FOREIGN PATENT DOCUMENTS

WO    2007/082355 A1    7/2007

OTHER PUBLICATIONS

International Search Report of PCT/IB/2012/001193 dated Sep. 27, 2012.

*Primary Examiner* — Noah Kamen
*Assistant Examiner* — Grant Moubry
(74) *Attorney, Agent, or Firm* — Sughrue Mion, PLLC

(57) ABSTRACT

Internal combustion engine comprising a cylinder housing component (1) displaying a first series of cylinders (2) and a second series of cylinders (3), some pistons (6,8), two lines of crankshafts suitable for coupling at the same rotation speed through a gear train (14,16) and a variably timed transmission (10), characterized in that the variably timed transmission (10) comprises a system of channels and/or passages linked, directly and/or indirectly, to the internal channel of the coupling shaft in order to feed lubricant to the internal ring (50) extending between the bracket (18) and the sliding tube (17), as well as into one or more of the channels extending between the coupling shaft (12) and a section of the sliding tube (17).

47 Claims, 8 Drawing Sheets

(56) References Cited

U.S. PATENT DOCUMENTS

| | | | |
|---|---|---|---|
| 4,334,720 A | | 6/1982 | Signer |
| 4,665,703 A | * | 5/1987 | David .............................. 60/595 |
| 4,876,992 A | * | 10/1989 | Sobotowski ................ 123/48 R |
| 5,638,777 A | * | 6/1997 | Van Avermaete ............ 123/52.4 |
| 6,409,464 B1 | | 6/2002 | Fisher et al. |
| 7,455,041 B2 | * | 11/2008 | Meyer et al. ................ 123/197.4 |
| 7,730,856 B2 | | 6/2010 | Van Avermaete |
| 2008/0190398 A1 | * | 8/2008 | Geirnaert .................... 123/51 R |

* cited by examiner

INTERNAL COMBUSTION ENGINE WITH VARIABLY TIMED TRANSMISSION

The present application is a CIP application of PCT/IB2012/001193 filed on Jun. 15, 2012, published on Dec. 27, 2012 under number WO2012/176037, and claiming the benefit of the priority of Luxemburg patent application 91831 filed on Jun. 24, 2011.

ABSTRACT OF THE DISCLOSURE

The invention relates to an internal combustion engine including a cylinder casing part having a first series of cylinders and a second series of cylinders, pistons, two lines of crankshafts capable of being coupled together, at a single speed of rotation, via a gear train and a variable transmission.

TECHNICAL FIELD

The subject of the invention is an internal combustion engine of the type described in document WO2007/082355, corresponding to U.S. Pat. No. 7,730,856 granted on Jun. 8, 2010, the content of which is incorporated herein by reference.

Through documents WO2007/082355 and U.S. Pat. No. 7,730,856, we know of the development of the variably timed transmission of a variable compression ratio engine to improve the control of the phase angle between first and second crankshafts. This means is defined by a new form of spatial movement between the two crankshafts, so as to generate overflow of coupling of the variably timed transmission side to the engine flywheel. The control of the variably timed transmission is provided with a direct working control jack to control the phase angle between the short-stroke crankshaft and the long-stroke crankshaft. Means are provided to enable the reduction, see preferably suppression of transfer of efforts of engine torque unregulated by the small crankshaft on the shaft line of the large crankshaft. Other means are also provided in the cylinder housing by a new arrangement of the paired cylinders enabling to form at their top dead centre a combustion chamber common to the two cylinders. Also, this new location of the paired cylinders in the cylinder housing allows the clearing of the two coupling means of the two crankshafts; said means permitting the standardization of the distance between the axis head—foot of the connecting rod of the larger crankshaft.

This document describes a novel combination of a combustion engine with variable volume with four strokes. The motor advantageously comprises a drive train where the two crankshafts are coupled at the same rotation speed by means of the variably timed transmission. The stroke of angular displacement between the two crankshafts made between the beginning and the end of travel of the variably timed transmission is arranged with an appropriate ratio between the two displacements of the paired cylinders and between the volume of the latter and the dead space, which enables to adjust the volumetric compression ratio of the engine by the linear displacement of the piston of the smaller cylinder relative to the strokes or phases of the motor.

By definition, the principle of supercharging piston engines is to increase air masses without increasing the cylinder volume. It means for the engines with fixed compression ratio an increased combustion pressure and a greater volumetric power (power per liter of cylinder). However, when the supercharging pressure is increased, the constraints of mechanical and thermal stresses increase on engine components. The major drawback is caused by the fact that the volumetric ratio, generated by the combustion chamber and the piston stroke is not adaptable, being unable to be adapted to variations in pressure and temperature of the intake air and speeds and temperatures of the engine.

Therefore, the engine designers meet certain design rules by determining, on the one hand, a limit to the amplitude of the pressure variations at the admission, and, on the other hand, by achieving an average compression ratio between the atmospheric suction pressure and the supercharging pressure. Since the determination of average compression ratio is a compromise at best reconciling the different engine speeds, the atmospheric air intake is operated at too low pressures and temperatures, and the supercharging stroke is operated at too high pressures and temperatures.

BRIEF DESCRIPTION OF THE INVENTION

The subject of the invention is an internal combustion engine of the type described in document WO2007/082355 or U.S. Pat. No. 7,730,856, namely a four stroke internal engine with at least an intake phase, a compression phase, an expansion phase and an exhaust phase, said engine operating by self-ignition or controlled ignition comprising:

a cylinder housing part having a first plurality of cylinders (2) each having an axis and a diameter, and a second series of cylinders (3) each having an axis and a diameter, the cylinders (2) of the first series having a volume and a diameter larger than the volume and diameter of the cylinders (3) of the second series, pistons (6, 8), each piston being adapted to be driven in a reciprocating movement in a cylinder and being associated with a rod, two lines of crankshafts having axes of rotation parallel to each other, a first line (4) having a crank with a large stroke, whilst the second line (5) has a crank with a small stroke less than the large stroke the crank of the first line of crankshaft, said crankshafts (4, 5) being adapted to be coupled to the same rotation speed by means of a gear train (14, 16) and a variably timed transmission (10);

wherein each piston being associated to a connecting rod (7.9) is operated with a crank of a crankshaft, the short-stroke crank of the second crankshaft (5) operating the connecting rod (9) of the piston (8) moving in the smaller cylinder (3), while the long-stroke crank of the first line of crankshaft (4) operates the connecting rod (7) of the piston (6) moving in the larger cylinder (2), wherein the first series of cylinders (2) is disposed above the first line of crankshaft (4), while the second series of cylinders (3) is disposed above the second line of crankshaft (5), and wherein each cylinder (2) of the first series communicates at least with one cylinder (3) of the second series via a clearance so as to form a group of two cylinders (2,3) communicating with each other to allow gas flowing from one cylinder to the other irrespective of the position of the pistons (6.8) moving in said cylinders (2,3).

In the engine according to invention, the cylinder housing part has advantageously a face along which the cylinders are open advantageously along the face of the cylinder head gasket plane, channels and passages being formed in the face of the cylinder housing being facing the joint plane of the cylinder head to form at least one distinct passage or channel for each cylinder group, a channel or passage of one group extending between a cylinder from the first series and a cylinder from the second series, said channel having an average and/or minimum width (determined in the plane of the cylinder head gasket) comprised between 0.25 and 2 times, advantageously between 0.3 and 1 times, preferably between 0.5 and 0.8 times the average of the diameters of the cylinders connected by the considered channel or passage.

FIG. 4 of U.S. Pat. No. 7,730,856 represents a plan view of the cylinder housing of FIG. 3 of U.S. Pat. No. 7,730,856. In perspective we can see the 4 groups of two cylinders (2, 3). The partial exploded view makes it possible to see the variably timed transmission (10), as well as the gears assembly (14, 16) of the two crankshafts (4, 5) without the two intermediate connecting gears (not shown). The pistons (6,8) are positioned in the exhaust phase to represent the intervals between the two couplings of the crankshafts (4, 5) and the side walls of the cylinder housing (1). Disengagement between the variably timed transmission (10) and the engine's flywheel (26) can be implemented on the basis of the angular aperture of the two paired cylinders (2,3) oriented in the form of asymmetrical inverted V's located at 24 degrees. The axes of the cylinders (2, 3) are not perpendicular to the plane of the cylinder head gasket. In relation to a straight line perpendicular to the plane of the cylinder head gasket, the axis of the larger cylinder (2) is advantageously less inclined than the axis of the small cylinder (3).

FIG. 5 of U.S. Pat. No. 7,730,856 shows a section view parallel to the axis of the variably timed transmission. At the end of the shaft (12) the external splines of the variably timed transmission can be seen.

FIG. 6 of U.S. Pat. No. 7,730,856 represents a partial section view of the variably timed transmission, the coupling shaft (12) of which is integrated with the shaft of the short-stroke crankshaft (5).

FIG. 7 of U.S. Pat. No. 7,730,856 is a perspective section view of the variably timed transmission integrated with the shaft of the short-stroke, in which the lubrication channels can be detected.

The variably timed transmission (10) in accordance with U.S. Pat. No. 7,730,856 (see FIGS. 1 to 3 attached to the present specification, said FIGS. 1 to 3 corresponding to FIGS. 5 to 7 of document WO2007/082355 or U.S. Pat. No. 7,730,856) is formed by three superposed concentric members: the first member is made up by the drive shaft (35) located in the inner part, the second element is made up by the sleeve (36) of the gear (14) located in the external part and the third element is made up by the slide tube (17) located in the intermediate part between the two aforementioned elements. Said sleeve (36) is held in a bearing plate (15) by means of a bearing (39) with an appropriate row between the bearing plate (15) and the sleeve (36). Said bearing plate (15) is fixed to the cylinder housing (1) so that the variably timed transmission (10) can constitute an assembly separated from the shaft (13) of the short-stroke crankshaft or first crankshaft line (5). For this purpose, the short-stroke crankshaft (5) and the variably timed transmission (10) are mounted connected with their respective shafts (12) and (13). The variably timed transmission (10) is provided with a bearing plate (15) which is fixed by centring in an orifice provided for in the cylinder housing (1). The straight internal splines of the shaft or transmission shaft (12) located in the pin of the bearing housing (20) are matched with the external straight splines of the shaft (13), in order to provide a sufficient level of rigidity for the axis of the variably timed transmission and a reduced space requirement for the coupling between the two shafts (12, 13); this layout making it possible to remove the variably timed transmission outside the engine block (1) without having to go on to remove the short-stroke crankshaft (5).

It has now been observed that the operation of the variably timed transmission of this document can be improved, with less friction, particularly over long periods of time, thus permitting optimal control of the compression rate desired through, for example, the control jack or other control moving means for the sliding tube (17).

The invention relates thus to a four-stroke internal combustion engine comprising, at least, an intake phase, a compression phase, an expansion phase and an exhaust phase, the said engine operating through self-ignition or through operated ignition. This engine, of the type described in document WO2007/082355 or U.S. Pat. No. 7,730,856 is characterized by the fact that the variably timed transmission (10) includes a system of channels and/or passages linked, directly and/or indirectly, to the internal channel of the coupling shaft to feed lubricant to the internal ring (50) extending between the holding member (18) and the sliding tube (17), and also in one or more channels extending between the coupling shaft and a part of the sliding tube.

The invention relates thus to a four-stroke internal combustion engine comprising at least an intake phase, a compression phase, an expansion phase and an exhaust phase, said engine operating by an ignition selected from the group consisting of self-ignition and controlled ignition, said combustion engine comprising:

A cylinder housing part 1 having (a) a first series of cylinders 2, each cylinder of said series having an axis and a diameter, and (b) a second series of cylinders 3, each cylinder of said series having an axis and diameter, the cylinders 2 of the first series having a volume and a diameter larger than the volume and diameter of the cylinders (3) of the second series, Pistons 6,8, each piston being adapted to be driven in a reciprocating movement in a cylinder and being associated with a connecting rod, Two crankshaft lines having axes of rotation parallel to each other, a first crankshaft line 4 having a crank with a long stroke, while the second crankshaft line 5 has a crank with a short stroke, said short stroke of the crank of the second crankshaft line being less than the long stroke of the crank of the first crankshaft line, said first and second crankshaft lines being adapted to be coupled to the same rotation speed by means of a gear train 14,16 and a variably timed transmission 10;

wherein each piston being associated to a connecting rod 7,9 is operated with a crank of a crankshaft line, the crank with the short-stroke of the second crankshaft line operating the connecting rod of the piston moving in the cylinder of the second series, while the crank with the long-stroke of the first crankshaft line operates the connecting rod of the piston moving in the cylinder of the first series, wherein the first series of cylinders is arranged above the first crankshaft line, while the second series of cylinders is arranged above the second crankshaft line, wherein each cylinder 2 of the first series communicates with at least one cylinder of the second series via a clearance so as to form a group of two communicating cylinders 2,3 communicating with each other to allow gas passing from one cylinder to the other irrespective of the position of the pistons moving in said two communicating cylinders, the said engine including a fitting for the variably timed transmission 10, the said fitting being suitable to receive, at least partially, a control unit (or control moving means) governing the phase angle difference between the first and second crankshaft lines, the first and second crankshaft lines being associated with a first driving wheel and a second driving wheel respectively, while a driving means extends between the said first and second driving wheels 14,16, in which the variably timed transmission 10 comprises an assembly separated from the shaft of the second crankshaft line 5, the variably timed transmission being equipped with a bearing plate 15, which is fastened by centring in an orifice provided in the cylinder housing 1, the variably timed transmission comprising a transmission shaft 12 including coupling means for coupling the said transmission shaft to a shaft of the first or second crankshaft line, an end of the said transmission shaft displaying external splines, while the shaft 13 of the second crankshaft line 5 is provided with a means (such as an element attached to the shaft or an end portion of the shaft) with a hollow with internal splines adapted for co-operating with the external splines of the transmission shaft to ensure the coupling of the transmission shaft 12 to the shaft 13 of the second crankshaft line, while still permitting axial displacement between the transmission shaft and the shaft of the second crankshaft line, the variably timed transmission further comprising (a) a sliding tube 17 sliding axially in relation to the axis of rotation of the second crankshaft line, said sliding tube 17 having an outer surface provided with outer helicoidally splines, (b) stop means to limit the travel of the variably timed transmission between a start and an end of travel of the sliding tube, (c) an internal ring with a pair of bearings located between the sliding tube and a fixation piece 18 adapted to be connected to a control moving means or control unit controlling the movement of the sliding tube, (d) a sleeve in which the said sliding tube is adapted to slide, said sleeve comprising on its inner periphery helicoidally splines mated to the outer helicoidally splines of the sliding tube;

in which the transmission shaft displays an internal channel 100 for feeding at least one lubricant between the said transmission shaft and the sleeve 36, in which the variably timed transmission comprises a lubrication system comprising lubricant transfer means selected from the group consisting of channels and passages directly connected to the internal channel of the transmission shaft 12, and channels and passages indirectly connected to the internal channel of the transmission shaft to feed lubricant to the internal ring extending between the fixation piece 18 and the sliding tube, as well as within at least one channel extending between the transmission shaft and a part of the sliding tube, in which the transmission shaft 12 has a first end, a second end opposite to the first end, and an internal central channel extending in the shaft between said two ends, the first end being directed towards the shaft of the second crankshaft line, while the second end is adjacent to the fixation piece 18, whereby the second end of the internal central channel adjacent to the fixation piece being sealed;

in which a channel 111 connecting the internal central channel of the transmission shaft to a hollow 112 extending between the sliding tube and an external face of the transmission shaft 12 adjacent to the fixation piece 18, this channel being adapted to feed lubricant into a chamber 113 of the fixation piece 18 adjacent to the second end of the transmission shaft;

in which a channel 114 extending in the internal ring of the bearings 50,50bis between the chamber 113 of the fixation piece and at least one internal face of the bearings of the internal ring, said channel being adapted to feed lubricant between the pairs of bearings, the lubricant then being able to escape from the bearings of the internal ring;

in which the said lubrication system further comprises at least one passage permitting lubricant to flow out of the variably timed transmission 10 after the passage of the lubricant, at least, through the internal ring 50 extending between the fixation piece 18 and the sliding tube 17;

in which the said lubrication system is adapted to ensure the flow of lubricant by the centrifugal force created by the rotation of the transmission shaft 12.

Some features of this engine are given in the claims attached to the present description.

The invention relates also to a device or appliance or machine including, at least, an engine according to the invention, and also a variably timed transmission as defined in any of the claims.

Details and features of the invention will appear from the following description, in which reference is made to the attached drawings.

BRIEF DESCRIPTION OF THE DRAWINGS

In these drawings.

DESCRIPTION OF A PREFERRED EMBODIMENT OF THE INVENTION

Figure 1:
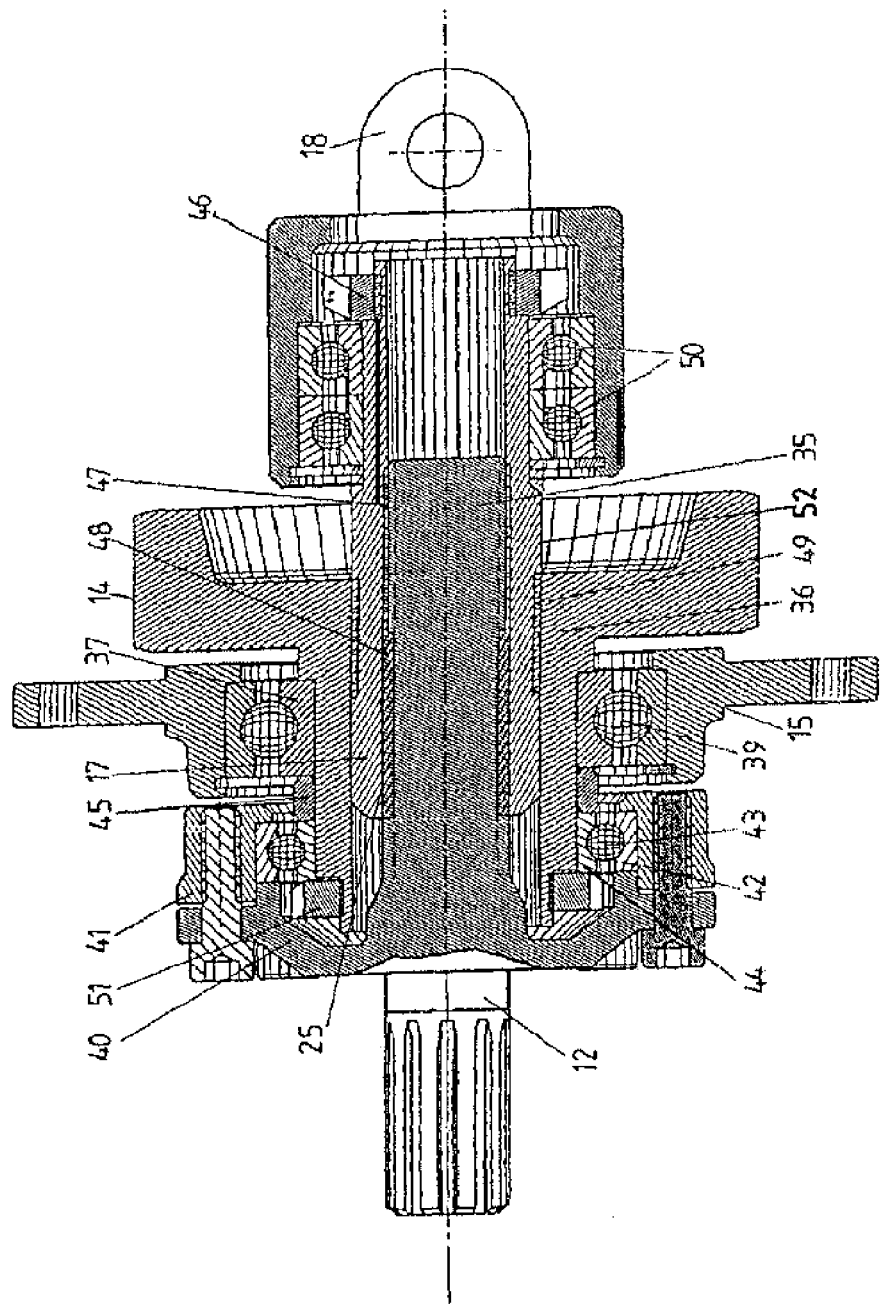
FIGS. 1 to 3 correspond to FIGS. 5 to 7 of document WO2007/082355 or U.S. Pat. No. 7,730,856.
Figure 2:
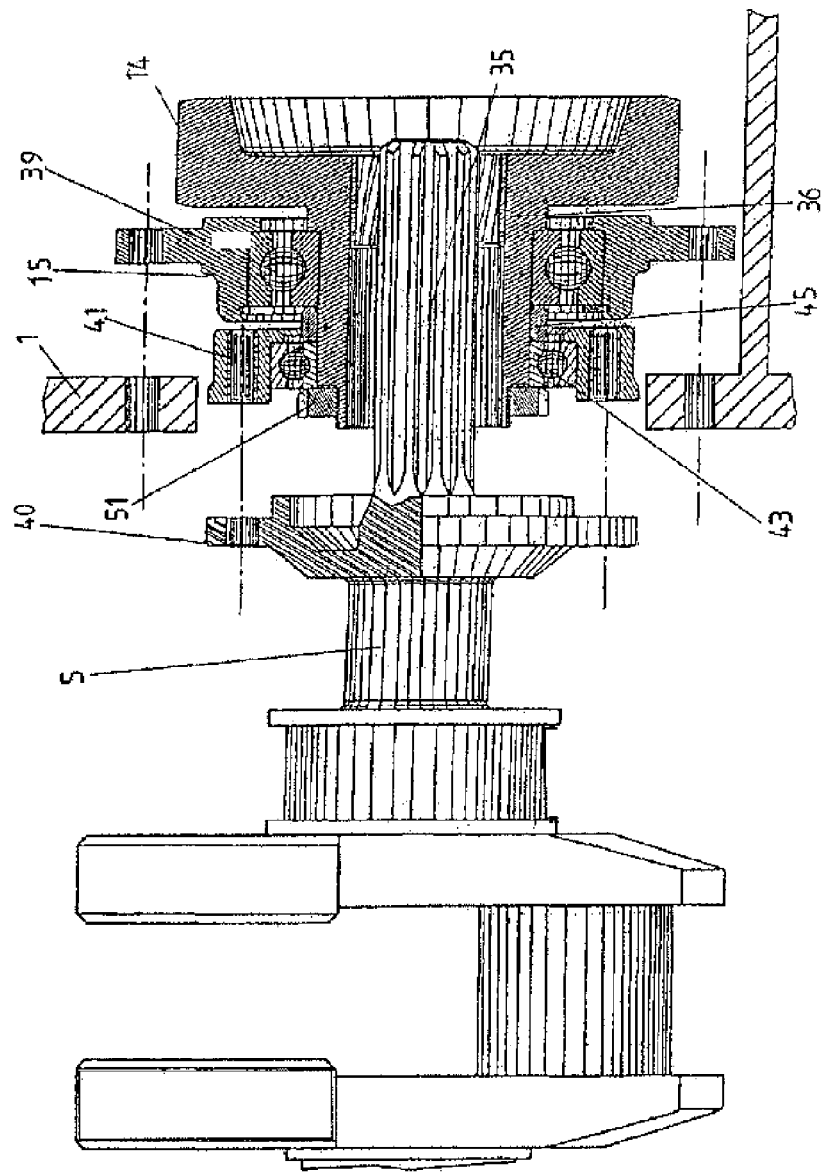
Figure 3:
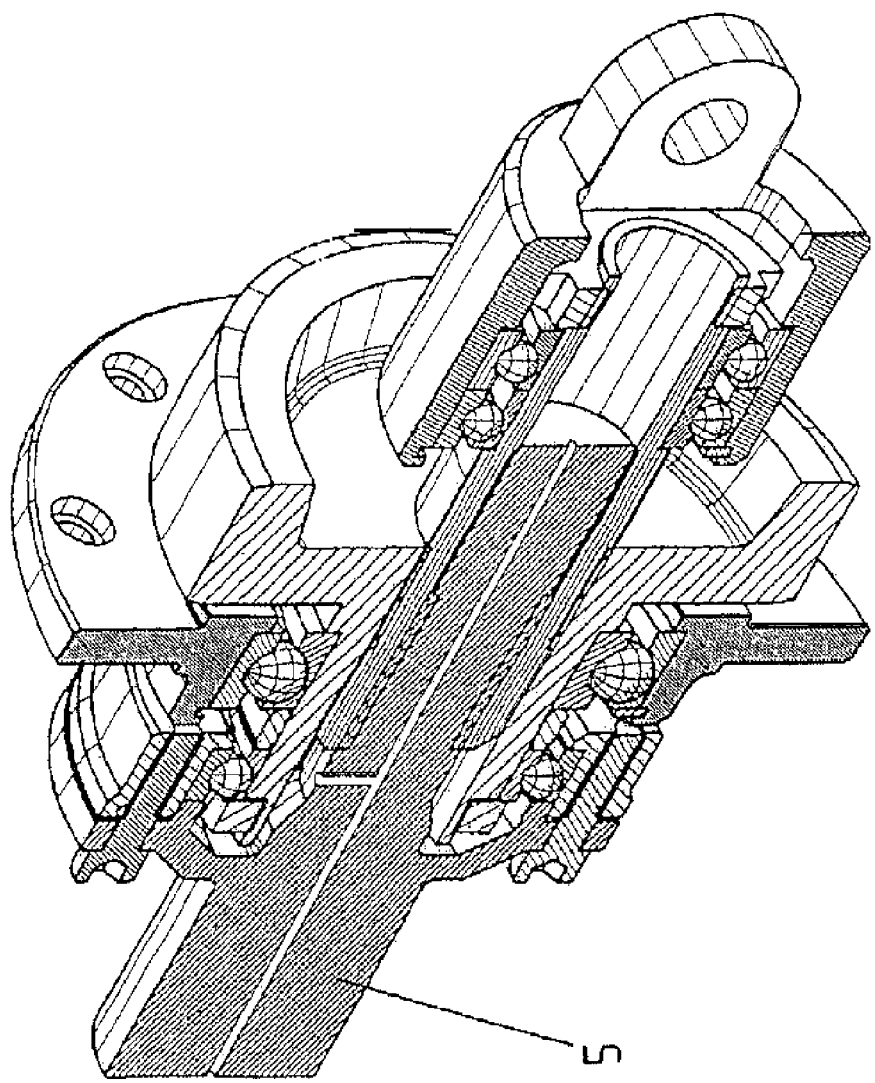

The text of application WO2007/082355, as well as of U.S. Pat. No. 7,730,856 is incorporated herein by reference, in particular with regard to the constituent components of an engine. The references used in the present text correspond to those used in document WO2007/082355 or U.S. Pat. No. 7,730,856 to represent similar or identical units or components. Some components or units of the engine in accordance with invention will not be shown in the drawings attached to the present text, as they are shown by way of example of embodiment in one or more figures of document WO2007/082355 or U.S. Pat. No. 7,730,856.

The four-stroke internal combustion engine according to invention includes, at least, an intake phase, a compression phase, an expansion phase and an exhaust phase, said engine operating by self-ignition or spark ignition comprising:

a cylinder housing part (1) having a first series of cylinders (2) each having an axis and a diameter and a second series of cylinders (3) each having an axis and diameter, the cylinders (2) of the first series having a volume and a diameter larger than the volume and diameter of the cylinder (3) of the second series, pistons (6, 8), each piston being adapted to be driven in a reciprocating movement in a cylinder and being associated to a connecting rod, two lines of crankshafts having axes of rotation parallel to each other, a first line (4) having a crank with a large stroke, whilst the second line (5) has a crank with a small stroke less than the long-stroke of the crank of the first line of crankshaft, said crankshafts (4, 5) being adapted to be coupled to the same rotation speed by means of a gear train (14, 16) and a variably timed transmission (10).

Each piston is associated to a connecting rod (7.9) operated with a crank of a crankshaft, the short-stroke crank of the second line of crankshaft (5) operating the rod (9) of the piston (8) moving in the smaller cylinder (3), while the long-stroke crank of the first line of crankshaft (4) operates the connecting rod (7) of the piston (6) moving in the larger cylinder (2).

The first series of cylinders (2) is disposed above the first line of crankshaft (4), while the second series of cylinders (3) is disposed above the second line of crankshaft (5).

Each cylinder (2) of the first series communicates with at least one cylinder (3) of the second series via a clearance so as to form a group of two cylinders (2,3) communicating with each other to allow gas flowing from one cylinder to the other irrespective of the position of the pistons (6.8) moving in said cylinders (2,3).

The engine includes a fitting for the variably timed transmission (10), the said fitting being suitable to receive, at least partially, a control unit governing the phase angle difference between the first and second crankshaft lines, the first and second crankshaft lines being associated with a first driving wheel and a second driving wheel respectively, while a driving means extends between the said wheels.

The variably timed transmission (10), comprises a unit which is separate from the shaft (13) of the short-stroke crankshaft (5), the variably timed transmission (10) being provided with a bearing plate (15) which is fixed by centring in an orifice provided in the cylinder housing (1), the variably timed transmission including a shaft (12) which is equipped with coupling means in order to couple the said shaft (12) to the shaft of the short-stroke crankshaft (5) or to the shaft of the long-stroke crankshaft, one end of the said shaft (12) displaying external splines, while the shaft (13) is associated to an element (20) or has a part having a recess with internal splines adapted to cooperate with the external splines of the shaft (12) in order to ensure that the shafts (12,13) can be coupled to one another, while permitting axial movement between them. The variably timed transmission also includes a tube or shaft (17) sliding axially relative to the axis of rotation of the crankshaft of the pistons of the cylinders of the first or second series, and stop means for limiting the movement of the variably timed transmission between a start and an end of travel.

The coupling shaft (12) displays an internal channel (100) to feed at least one lubricant between the said shaft (12) and the sleeve (36).

The variably timed transmission (10) according to invention includes a system of channels and/or passages 100,101, etc. linked, directly and/or indirectly, to the internal channel 100 of the coupling shaft 12 to feed the lubricant to the internal ring (50) extending between the holding piece (18) and the sliding tube (17), as well as one or more channels extending between the coupling shaft 12 and a part of the sliding tube 17.

The system of channels and/or passages linked, directly and/or indirectly, to the internal channel of the coupling shaft includes one or more passages permitting the lubricant to escape from the variably timed transmission (10) following the lubricant's movement through, at least, the internal ring (50) extending between the holding piece (18) and the sliding tube (17).

In particular, the system of channels and/or passages 100, 101 linked, directly and/or indirectly, to the internal channel 100 of the coupling shaft 12 is laid out to ensure that the lubricant flows, due to the centrifugal force created by the rotation of the coupling shaft (12).

The system of channels and/or passages comprises the following channels:

a central channel 100 extending in the shaft 12 between its two ends, the end of the channel 100 adjacent to the holding piece 18 being sealed;

a channel 101 (advantageously radial) extending between the central channel 100 and one or more splines of the coupling end 12bis of the shaft 12;

a groove 102, extending between the coupling component 12a and the bearing 40, this groove being suitable to receive the lubricant expelled from the splines during an axial movement, with a recess with a spline at one end of a splined shaft;

a channel 103 to feed lubricant from the central channel 100 towards the end of the sliding tube 17 directed towards the engine camshaft, said shaft in fact feeding lubricant into a doughnut-shaped chamber 104 displaying a doughnut-shaped groove 105 located, at least partially, at a cylindrical level in relation to the axis of the shaft 12 located below the internal cylindrical face of the tube 17;

a channel 106 linking the doughnut-shaped chamber 105 to a doughnut-shaped chamber 107 intended to feed lubricant at the level of the bearing 43;

a flared channel 108 which increases the lubricant's speed, linking the bearing 43 to a distribution chamber 109 distributing lubricant at the level of the bearings 39 of the bearing plate 15, the distribution chamber 109 displaying a drainage outlet 110 feeding lubricant between a section of the bearing plate 15 and a portion of the bearing 40, with lubricant being able to escape from the bearing 39 between the bearing plate 15 and the gears 14;

a channel 111 linking the central channel 100 to a hollow 112 extending between the tube 17 and the external face of the shaft 12, with this channel also feeding lubricant into a chamber 113 of the holding piece 18;

a channel 114 extending in the internal ring of the bearings 50 between the chamber 113 and the internal face of the bearings, with this channel feeding lubricant between the pairs of bearings 50, 50bis, the lubricant thus being able to escape from the bearings 50, 50bis.

Figure 4:
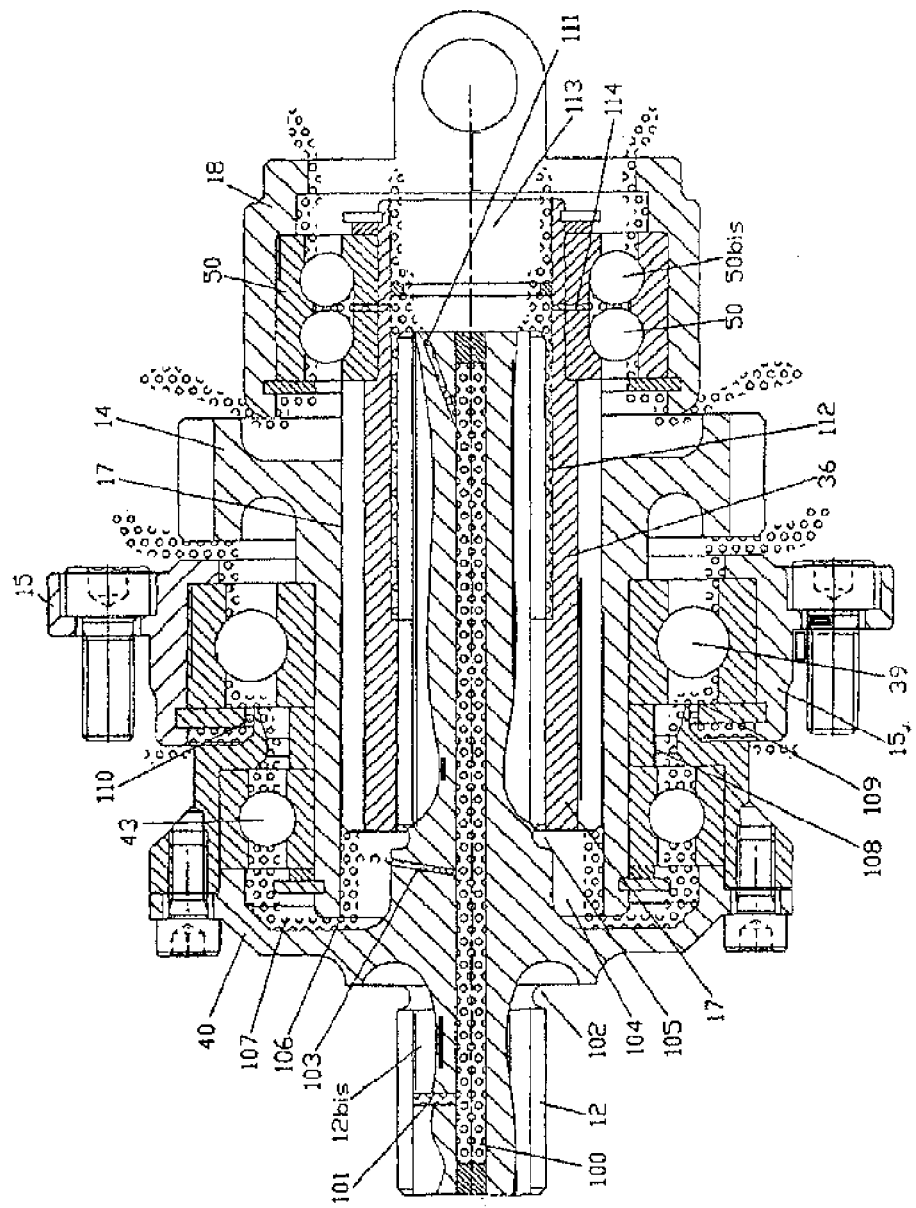
FIG. 4 is a cross-section view of a variably timed transmission according to invention, intended to be mounted on an engine of the type described in document WO2007/082355 or U.S. Pat. No. 7,730,856, and FIGS. 5 to 8 correspond to FIGS. 1 to 4 of document WO2007/082355 or U.S. Pat. No. 7,730,856.
Figure 5:
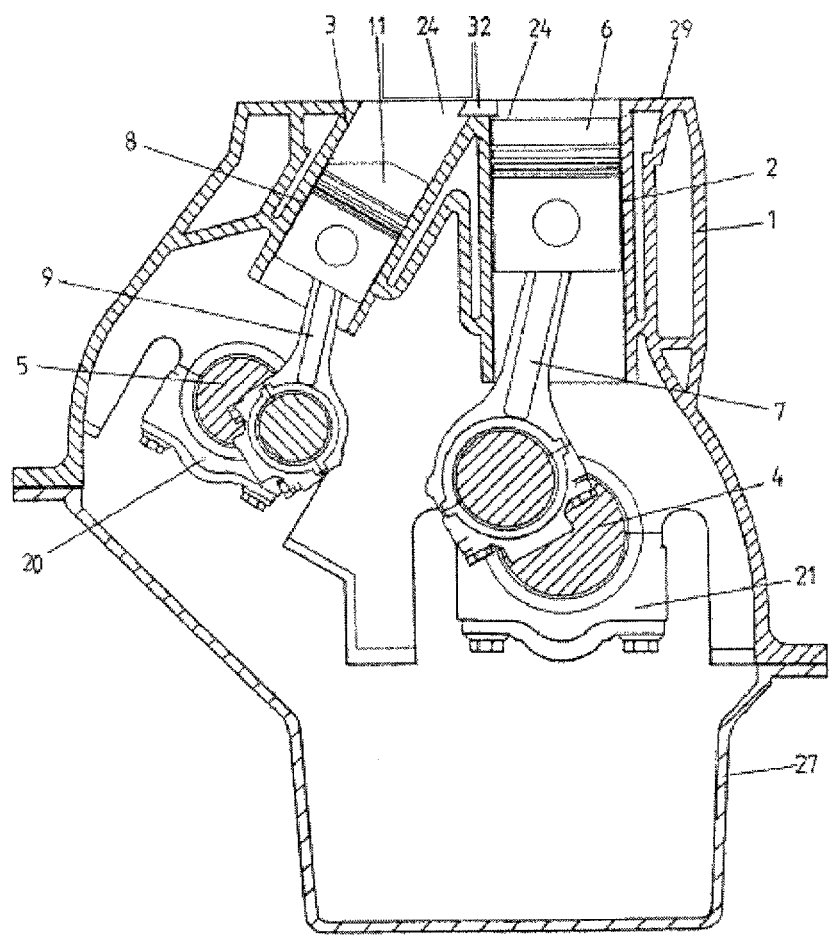
Figure 6:
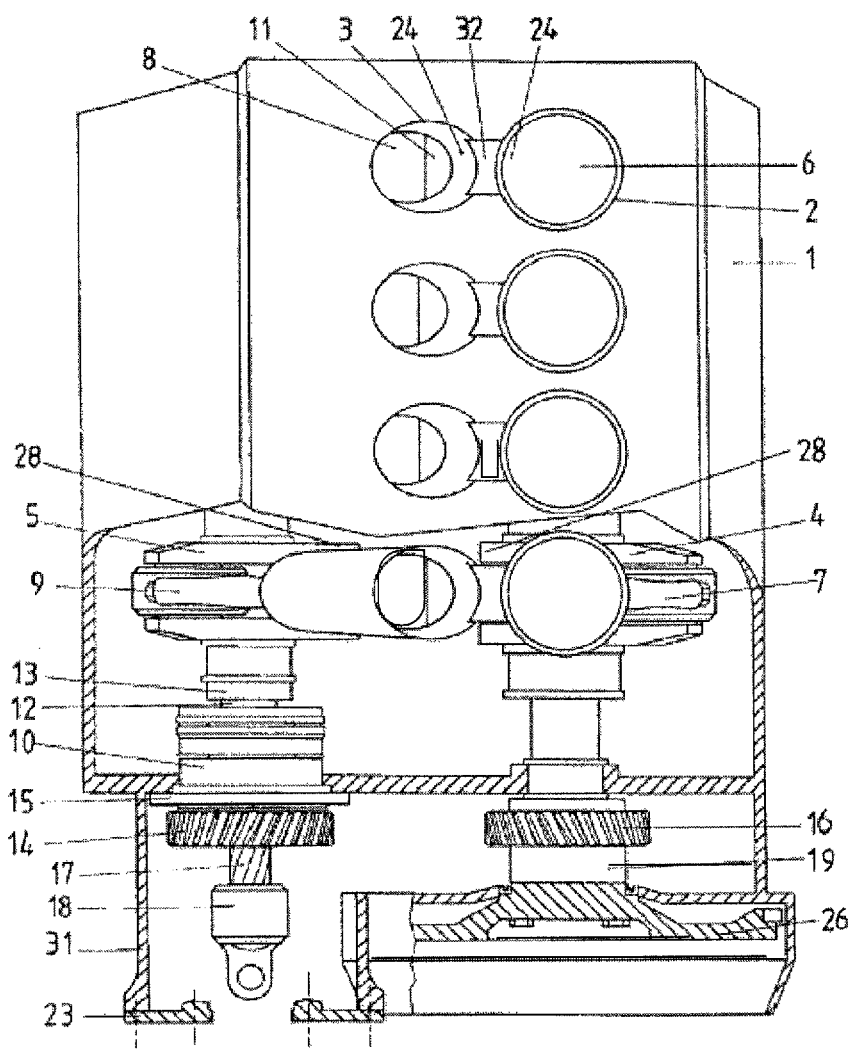
Figure 7:
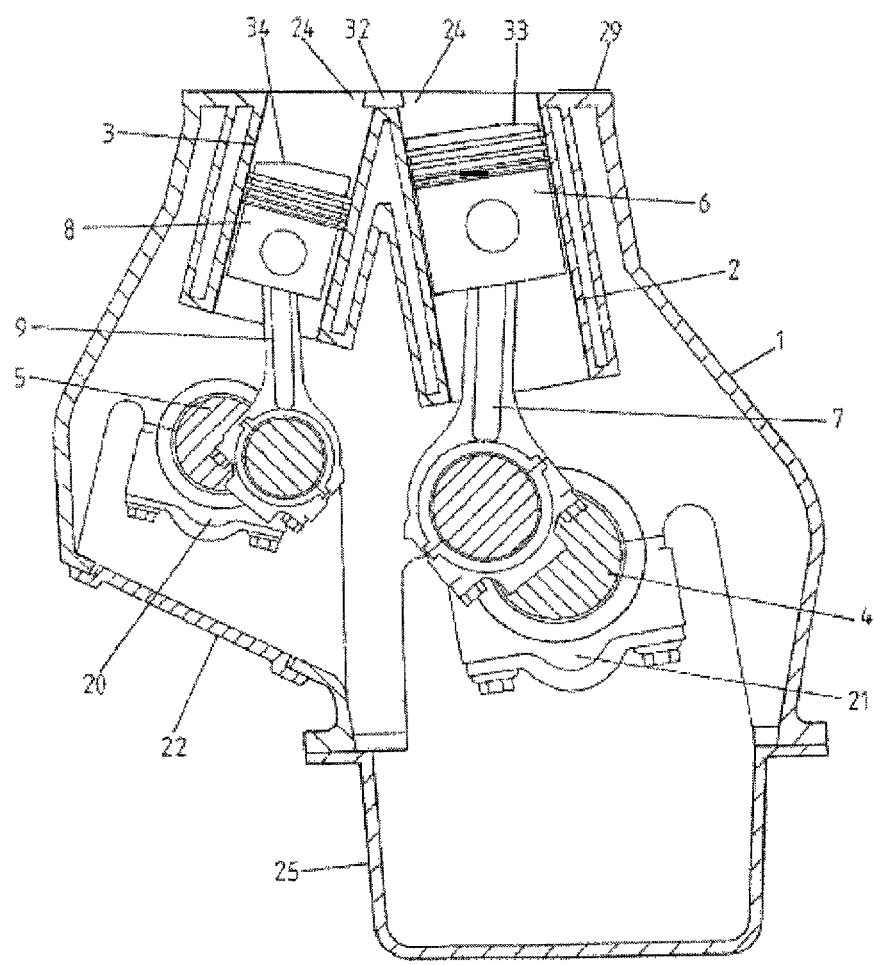
Figure 8:
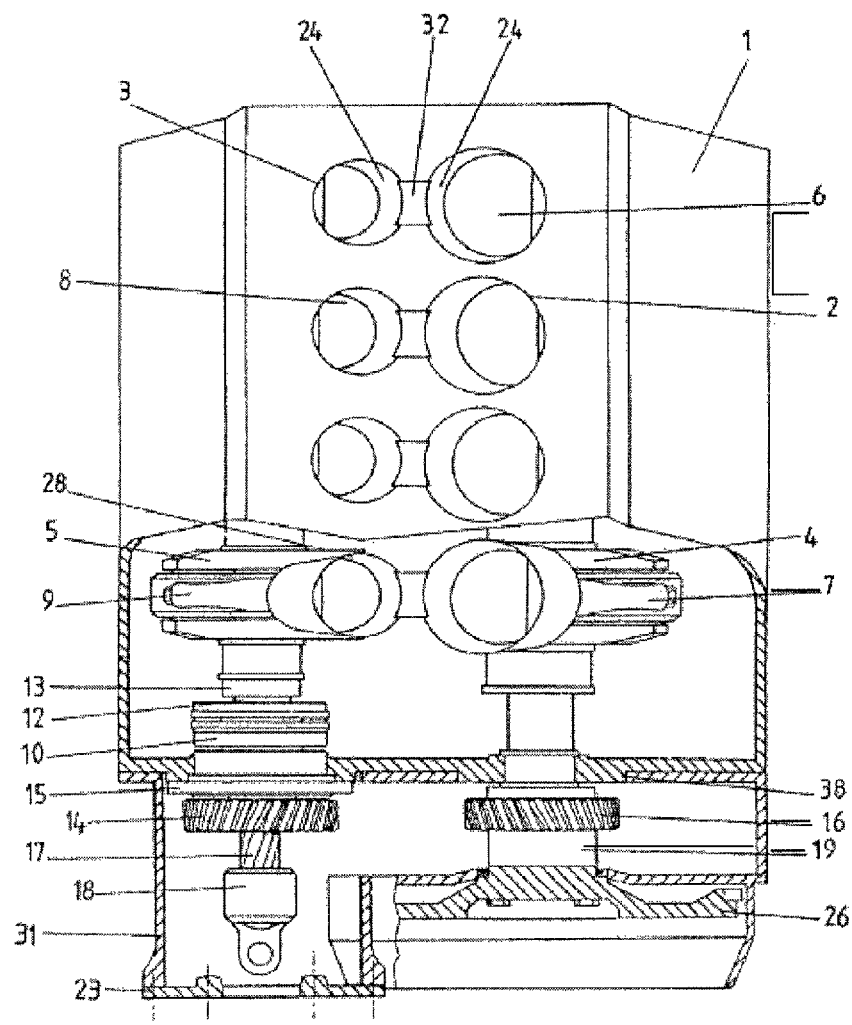

The lubricant is fed into the central channel 100 under pressure or under light pressure. Then, during the rotation of the shaft 12, the lubricant flows out into the various channels and chambers due to centrifugal force. Thanks to the lubricant flowing into the variably timed transmission, and to its expulsion by centrifugal force, the various moving parts of the variably timed transmission are lubricated and cleaned, thus assuring a better sliding. The lubricant is shown in FIG. 4 by little bubbles in a broken line, in the position reached during the rotation of the shaft 12 (the lubricant being subjected to centrifugal force).

Advantageously, as described in document WO2007/082355, the substitution of a coupling without support between the carrier without short-stroke crankshaft (5) and the variably timed transmission (10) by a coupling with support by the bearing (20) of the journal of the short-stroke crankshaft (5) has the advantage to limit the bearing (39) appropriate to a single row between the bearing (15) and the sleeve (36).

The shaft (35) and the sleeve (36) are advantageously held concentrically and axially with respect to one another by means of a bearing (40) integral with the shaft (35). The bearing (40) has a bearing (43) in axial and radial thrust to permit free rotation of the shaft (35) independently of the sleeve (36). The bearing (40) is an integral part of the shaft (35) at the location where to limit the location of the straight splines (12) and (47). The bearing (40) and the sleeve (36) are located inside the motor housing (1). The bearing (40) is formed as a disk pierced with orifices regularly for the bolting of a ring (41) located on the side where the straight splines (47) of the shaft (35) are ended. The application of the ring (41) on the bearing (40) is used to form a housing for fixing the outer ring (42) of the bearing (43) in axial and radial efforts, while the inner ring (44) of the bearing (43) is fixed to the sleeve (36) against a ring-shaped spacer (45) surrounding the sleeve (36), the spacer (45) serves to take up the space of separation between the inner ring (44) of the bearing (43) and the inner ring (37) of the bearing (39), the latter being held axially against a shoulder provided on the sleeve (36) by the fixing of all the documents mentioned above by means of a nut (51) on the sleeve (36).

The gear (14) of the sleeve (36) is located outside the motor housing (1) coupled to the same rotational speed with the long-stroke crankshaft (4) by means of a gear (16) rigidly mounted on the last and two intermediate gears (not shown) between the two aforesaid gears (14, 16).

The transmission shaft (35) comprises on the side of the bearing (40) facing the bearing plate (15), straight splines (47) onto which the sliding tube (17) is engaged. This sliding tube (17) has, on its inner periphery, some splines (48) mated to the straight splines (47), so that the sliding tube (17) can slide axially on the transmission shaft (35). The sleeve (36) has on its inner periphery helical splines (49) mated to the outer helical splines (52) of the sliding tube (17), so as to permit the latter to travel helically in the sleeve (36) and provide an angular displacement between said second and third members, at the same time as the straight sliding between the said first and third aforementioned elements. The sleeve (36) is fixed rotationally with the shaft (17) when the sliding tube (17) is not in axial translation.

The length of the sliding tube (17) is pre-set within the sleeve (36) when the end of said sliding tube (17) is located at the stop limit defined by the obstruction of the bearing housing (40). The other end of the sliding tube (17) is free outside the sleeve (36), passing through the gear (14) outside the engine unit (1) to permit, by appropriate means, the fastening of the internal bearing ring (50) in two-row oblique. Said internal bearing ring (50) is made interdependent with the rotational movement of the sliding tube (17), while the external bearing ring (50), without any rotational movement, is made interdependent with the holding member (18).

A decision-making memory of the compression ratio program acting by means of a hydraulic control system allows the displacement of the holding member (18) and the sliding tube (17) so as to alter to change the lead angle between the two crankshafts (4, 5).

The start-of-travel of the variably timed transmission stroke is arranged so that the sliding tube (17) is in the exit stop position provided for on the output jack (not shown) corresponding to the minimum angular feed of the crank of the short-stroke crankshaft (5) and the crank of the long-stroke crankshaft (4).

The end-of-travel of the variably timed transmission is arranged such that the sliding tube (17) in the stop position (also provided on the actuator jack, but not shown) corresponding to the maximum angular feed of the crank of the short-stroke crankshaft (5) relative to the crank of the long-stroke crankshaft (4).

Engine timing is carried out by at least one camshaft (not shown) in mesh, at half speed, with the long-stroke crankshaft (4). The intake and exhaust valves in the cylinder head (not shown) communicating periodically the two cylinders (2,3) with the inlet and exhaust pipes (not shown) at specific times of the four-stroke process.

The ratio between the volume of the cylinder (3) and the volume of the cylinder (2) is at least between 1/10 and 9/10, preferably between 1/5 and 3/5 making it possible to adapt the compression ratio of the engine the rate of the supercharging pressure.

The variably timed transmission (10) is provided with a bearing plate (15) which is fixed to the cylinder housing (1), so that the variably timed transmission (10) can constitute a separate assembly from the shaft (13) of the short-stroke crankshaft (5). To this end, the variably timed transmission (10) and the short-stroke crankshaft (5) are each formed with their respective shaft (12, 13). The external splines end of the shaft (12) of the variably timed transmission (10) is constructed so as to make the internal splines located in the bearing housing (20) journal and in the shaft (13) correspond. The coupling between the two abutting parts is provided for by axial sliding at the moment of application of the bearing plate (15) into an orifice provided for in the cylinder housing (1). The bearing plate (15) is centred on the shaft (13) of the short-stroke crankshaft (5), so as to allow centring of the shaft (12) in the journal (20) and in said shaft (13), the latter serving advantageously as rigid bearing housing for the shaft (12) upon application of the bearing plate (15) on the cylinder (1), and this means for the removal of the variably timed transmission (10) out of the cylinder housing and out of the coupling housing(s) without having to disassemble the crankshaft short-stroke (5).

The abutting end of the male shaft (12) of the variably timed transmission (10) and the female end contiguously formed in the shaft (13) on the bearing housing (20) of the short-stroke crankshaft (5) provide the advantage of reducing the overall size of the coupling of the variably timed transmission in the crankcase (1).

In a preferred embodiment of the invention, the engine comprises means for enhancing axial rigidity between the short-stroke crankshaft (5) and the variably timed transmission (10), shafts (12 and 13) are merged into a single shaft to allow that the transmission shaft (35) including the disc (40) and straight splines (47) are associated to the short-stroke crankshaft (5). The separation distance between the fastening supports of the disc (40) and the bearing (15) is carried out at the same separation distance between fastening of the cylinder housing (1) of the bearing (15) and the mounting support of the disc (40) when the shaft of the short-stroke crankshaft is inserted into the bearing (20) of the cylinder housing (1). It follows from this assembly an axial fixing of the shaft of the short-stroke crankshaft (5) through the bearing (39) and fixing the radial sleeve (36) by the bearings of the short-stroke crankshaft (5).

In a preferred embodiment of the invention, the coupling housing (31) there are two intermediate coupling gears (not shown) between the gears (14) of the short-stroke crankshaft (5) and a second gear (16) fixed to the strut (19) fixed to the engine flywheel (26) and the long-stroke crankshaft (4) so as to obtain the rotation direction inverse to the same speed of the two crankshafts (4, 5).

The variably timed transmission (10) comprises a sliding tube (17) on the side facing the gear (14), the outer part of the sliding tube comprises on its outer periphery of the helical splines matched to the helical splines (not shown) the gear (14). The sliding tube (17) also comprises straight internal splines (not shown) mated to the external splines integral with the shaft (12) (not shown) onto which the sliding tube (17) is mounted, so that said tube (17) by sliding is able to obtain the angular offset between the transmission shaft (12) and the gear (14).

A compression ratio decision program memory acts on the actuating jack (not shown) attached to the holding piece (18) and the sliding tube (17) to change the angular setting between the two crankshafts (4,5).

The start and end of travel of the variably timed transmission can be arranged such that the sliding tube (17) cannot slide beyond the stop positions which are provided on the control jack (not shown). Said control jack is fastened on a support provided for on the closure cover (23) of the coupling housing (31) located next to the engine flywheel (26). Removing the closing cover (23) makes it possible to have access for the maintenance or for the removal of the variably timed transmission (10) without the removal of the coupling housing (31). According to the invention and according to this layout, the axis of said control cylinder is advantageously fixed to the holding member (18) of the control of the variably timed transmission (10).

According to a preferred embodiment of the invention, the minimum and maximum volumetric ratios selected for the type of engine to be designed are determined according to the dimensions of the various parts of the engine, i.e. the one hand, the relationship between the maximum volumes of the two paired cylinders (2 and 3) and secondly, the ratio formed by the total volume of said two maximum volumes of these two cylinders (2,3) with the clearance space (24), these ratios being defined so that the maximum lead angle of the crank of the short-stroke crankshaft (5) with respect to the crank of the long-stroke crankshaft (4), defined by the position of end of travel of the variably timed transmission, do match, at the end of compression phase (top dead centre of the piston 6), the position of the piston (8) with respect to the additional volume required for the clearance space (24) to define said minimum compression ratio of the engine with an angle of at least 90° between the connecting rod (9) and the crank of the short-stroke crankshaft (5).

The variably timed transmission according to invention is suitable for the engine described in document WO2007/082355, but can likewise be used with other engines including:

A cylinder housing part (1) having a first series of cylinders (2) each having an axis and a diameter and a second series of cylinders (3) each having an axis and a diameter, the cylinders (2) of the first series having a maximum volume and a diameter larger than the maximum volume and the diameter of the cylinders (3) of the second series, Pistons (6, 8), each piston being adapted to be driven in a reciprocating movement in a cylinder and being associated with a connecting rod, Two lines of crankshafts having axes of rotation parallel to each other, a first line (4) having a crank with a long stroke, while the second line (5) has a crank with a small stroke less than the long-stroke of the crank of the first crankshaft, said crankshafts (4, 5) being adapted to be coupled to the same rotation speed by means of a gear train (14, 16) and a variably timed transmission (10).

What I claim is:

1. A four-stroke internal combustion engine comprising at least an intake phase, a compression phase, an expansion phase and an exhaust phase, said engine operating by an ignition selected from the group consisting of self-ignition and controlled ignition, said combustion engine comprising:

A cylinder housing part having (a) a first series of cylinders, each cylinder of said series having an axis and a diameter, and (b) a second series of cylinders, each cylinder of said series having an axis and diameter, the cylinders of the first series having a volume and a diameter larger than the volume and diameter of the cylinders (3) of the second series, Pistons, each piston being adapted to be driven in a reciprocating movement in a cylinder and being associated with a connecting rod, Two crankshaft lines having axes of rotation parallel to each other, a first crankshaft line having a crank with a long stroke, while the second crankshaft line has a crank with a short stroke, said short stroke of the crank of the second crankshaft line being less than the long stroke of the crank of the first crankshaft line, said first and second crankshaft lines being adapted to be coupled to the same rotation speed by means of a gear train and a variably timed transmission;

wherein each piston being associated to a connecting rod is operated with a crank of a crankshaft line, the crank with the short-stroke of the second crankshaft line operating the connecting rod of the piston moving in the cylinder of the second series, while the crank with the long-stroke of the first crankshaft line operates the connecting rod of the piston moving in the cylinder of the first series, wherein the first series of cylinders is arranged above the first crankshaft line, while the second series of cylinders is arranged above the second crankshaft line, wherein each cylinder of the first series communicates with at least one cylinder of the second series via a clearance so as to form a group of two communicating cylinders communicating with each other to allow gas passing from one cylinder to the other irrespective of the position of the pistons moving in said two communicating cylinders, the said engine including a fitting for the variably timed transmission, the said fitting being suitable to receive, at least partially, a control moving means governing the phase angle difference between the first and second crankshaft lines, the first and second crankshaft lines being associated with a first driving wheel and a second driving wheel respectively, while a driving means extends between the said first and second driving wheels, in which the variably timed transmission comprises an assembly separated from the shaft of the second crankshaft line, the variably timed transmission being equipped with a bearing plate, which is fastened by centring in an orifice provided in the cylinder housing, the variably timed transmission comprising a transmission shaft including coupling means for coupling the said transmission shaft to a shaft of the first or second crankshaft line, an end of the said transmission shaft displaying external splines, while the shaft of the second crankshaft line is provided with a means with a hollow with internal splines adapted for co-operating with the external splines of the transmission shaft to ensure the coupling of the transmission shaft to the shaft of the second crankshaft line, while still permitting axial displacement between the transmission shaft and the shaft of the second crankshaft line, the variably timed transmission further comprising (a) a sliding tube sliding axially in relation to the axis of rotation of the second crankshaft line, said sliding tube having an outer surface provided with outer helicoidally splines, (b) stop means to limit the travel of the variably timed transmission between a start and an end of travel of the sliding tube, (c) an internal ring with a pair of bearings located between the sliding tube and a fixation piece adapted to be connected to a control moving means controlling the movement of the sliding tube, (d) a sleeve in which the said sliding tube is adapted to slide, said sleeve comprising on its inner periphery helicoidally splines mated to the outer helicoidally splines of the sliding tube;

in which the transmission shaft displays an internal channel for feeding at least one lubricant between the said transmission shaft and the sleeve, in which the variably timed transmission comprises a lubrication system comprising lubricant transfer means selected from the group consisting of channels and passages directly connected to the internal channel of the transmission shaft, and channels and passages indirectly connected to the internal channel of the transmission shaft to feed lubricant to the internal ring extending between the fixation piece and the sliding tube, as well as within at least one channel extending between the transmission shaft and a part of the sliding tube, in which the transmission shaft has a first end, a second end opposite to the first end, and an internal central channel extending in the shaft between said two ends, the first end being directed towards the shaft of the second crankshaft line, while the second end is adjacent to the fixation piece, whereby the second end of the internal central channel adjacent to the fixation piece being sealed;

in which a channel connecting the internal central channel of the transmission shaft to a hollow extending between the sliding tube and an external face of the transmission shaft adjacent to the fixation piece, this channel being adapted to feed lubricant into a chamber of the fixation piece adjacent to the second end of the transmission shaft;

in which a channel extending in the internal ring of the bearings between the chamber of the fixation piece and at least one internal face of the bearings of the internal ring, said channel being adapted to feed lubricant between the pairs of bearings, the lubricant then being able to escape from the bearings of the internal ring;

in which the said lubrication system further comprises at least one passage permitting lubricant to flow out of the variably timed transmission after the passage of the lubricant, at least, through the internal ring extending between the fixation piece and the sliding tube;

in which the said lubrication system is adapted to ensure the flow of lubricant by the centrifugal force created by the rotation of the transmission shaft.

2. The engine of claim 1, wherein for each group of two communicating cylinders, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane, wherein said first and second planes define there between an angle between 1° and 60°.

3. The engine of claim 2, wherein said first and second planes define there between an angle between 10° and 50°.

4. The engine of claim 1, wherein for each group of two communicating cylinders, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane, wherein said first and second planes define there between an angle between 1° and 60°, and wherein the axes of the cylinders of each group of two communicating cylinders intersects at a point belonging substantially to a same straight line.

5. The engine of claim 1, wherein for each group of two communicating cylinders, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane, wherein said first and second planes define there between an angle between 1° and 60°, wherein a plane is defined by the axes of rotation of the first and second crankshaft lines, and wherein a median plane is defined between said first and second planes, the said median plane of a group of cylinders is substantially perpendicular to the plane defined by the axes of rotation of the first and second crankshaft lines.

6. The engine of claim 1, which comprises a camshaft in mesh, at half speed, with the first crankshaft line for ensuring periodic communication of the groups of two communicating cylinders with inlet and exhaust pipes by means of intake and exhaust valves at predetermined moments of the four stroke cycle.

7. The engine according to claim 6 wherein a flywheel is mounted on the shaft of the first crankshaft line, while the variably timed transmission is connected to the shaft of the second crankshaft line, and wherein the shafts of the two crankshaft lines are adapted so that the variably timed transmission is located next to the engine flywheel.

8. The engine of claim 1, wherein the control moving means of the variably timed transmission comprises a control jack in direct drive with the fixation piece, to control the phase angle difference between the second crankshaft line and the first crankshaft line.

9. The engine of claim 1, in which the shaft of the second crankshaft line is associated with a bearing journal having internal splines co-operating with the external splines of the transmission shaft.

10. The engine of claim 1, in which for reinforcing the axial rigidity between the shaft of the second crankshaft line and the variably timed transmission, the transmission shaft of the variably timed transmission and the shaft of the second crankshaft line are merged into a single shaft.

11. The engine of claim 1, comprising an engine flywheel which is fixed on the end of the shaft of the first crankshaft line.

12. The engine of claim 11, in which said engine flywheel is located in a coupling housing, while the variably timed transmission is axed on the end of the shaft of the second crankshaft line next to the engine flywheel.

13. The engine of claim 12, which comprises, in the coupling housing, a transmission with gear train between the shaft of the second crankshaft line and the engine flywheel via the variably timed transmission.

14. The engine of claim 1, in which the control moving means for the sliding tube is a control jack controlling the axial displacement of the sliding tube, said control jack being associated with stop means for limiting the displacement between said start and end of travel.

15. The engine of claim 14, in which said control jack is fixed to a support provided on a closing cover of a coupling housing in which the variably timed transmission is located, said coupling housing being located next to an engine flywheel mounted on an end of the shaft of the first crankshaft line.

16. The engine of claim 1, in which the shafts of the first and second crankshaft lines are associated with gears in direct drive, the shafts of the first and second crankshaft lines rotating in opposite directions of rotation and at the same speed, the shafts of the first and second crankshaft lines being each provided with a gear and being coupled to each other by a set of two intermediate coupling gears disposed between the two gears mounted on the shafts of the first and second crankshaft lines, so that they rotate in opposite directions of rotation and at the same speed, while the two intermediate gears located between the said gears mounted on the shafts of the first and second crankshaft lines are arranged and coupled to each side of a plane passing through the axes of the shafts of the first and second crankshaft lines.

17. The engine according to claim 1, in which the variably timed transmission comprises a lubrication system comprising at least one channel selected from the group consisting of:
- a channel extending between the central internal channel of the transmission shaft and at least one spline of a coupling end of the transmission shaft;
- a groove extending between the coupling means and the bearing, this groove being suitable to receive the lubricant expelled from the splines during an axial movement within a recess with spline of an end of a camshaft;
- a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
- a channel linking a doughnut-shaped chamber to a doughnut-shaped chamber, intended to feed lubricant to the level of the bearing;
- a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

18. The engine according to claim 1, in which the variably timed transmission comprises a lubrication system comprising several channels selected from the group consisting of:
- a channel extending between the central internal channel of the transmission shaft and at least one spline of a coupling end of the transmission shaft;
- a groove extending between the coupling means and the bearing, this groove being suitable to receive the lubricant expelled from the splines during an axial movement within a recess with spline of an end of a camshaft;
- a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
- a channel linking a doughnut-shaped chamber to a doughnut-shaped chamber, intended to feed lubricant to the level of the bearing;
- a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

19. The engine according to claim 1, in which the variably timed transmission comprises a lubrication system comprising at least the following channels:
- a channel extending between the central internal channel of the transmission shaft and at least one spline of a coupling end of the transmission shaft;
- a groove extending between the coupling means and the bearing, this groove being suitable to receive the lubricant expelled from the splines during an axial movement within a recess with spline of an end of a camshaft;
- a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
- a channel linking a doughnut-shaped chamber to a doughnut-shaped chamber, intended to feed lubricant to the level of the bearing;
- a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

20. Unit selected from the group consisting of device, appliance and machine, said unit comprising, at least one four-stroke internal combustion engine comprising at least an intake phase, a compression phase, an expansion phase and an exhaust phase, said engine operating by an ignition selected from the group consisting of self-ignition and controlled ignition, said combustion engine comprising:
- a cylinder housing part having (a) a first series of cylinders, each cylinder of said series having an axis and a diameter, and (b) a second series of cylinders, each cylinder of said series having an axis and diameter, the cylinders of the first series having a volume and a diameter larger than the volume and diameter of the cylinders (3) of the second series,
- pistons, each piston being adapted to be driven in a reciprocating movement in a cylinder and being associated with a connecting rod,
- two crankshaft lines having axes of rotation parallel to each other, a first crankshaft line having a crank with a long stroke, while the second crankshaft line has a crank with a short stroke, said short stroke of the crank of the second crankshaft line being less than the long stroke of the crank of the first crankshaft line, said first and second crankshaft lines being adapted to be coupled to the same rotation speed by means of a gear train and a variably timed transmission;
- wherein each piston being associated to a connecting rod is operated with a crank of a crankshaft line, the crank with the short-stroke of the second crankshaft line operating the connecting rod of the piston moving in the cylinder of the second series, while the crank with the long-stroke of the first crankshaft line operates the connecting rod of the piston moving in the cylinder of the first series,
- wherein the first series of cylinders is arranged above the first crankshaft line, while the second series of cylinders is arranged above the second crankshaft line,
- wherein each cylinder of the first series communicates with at least one cylinder of the second series via a clearance so as to form a group of two communicating cylinders communicating with each other to allow gas passing from one cylinder to the other irrespective of the position of the pistons moving in said two communicating cylinders,
- the said engine including a fitting for the variably timed transmission, the said fitting being suitable to receive, at least partially, a control unit governing the phase angle difference between the first and second crankshaft lines, the first and second crankshaft lines being associated with a first driving wheel and a second driving wheel respectively, while a driving means extends between the said first and second driving wheels, in which the variably timed transmission comprises an assembly separated from the shaft of the second crankshaft, the variably timed transmission being equipped with a bearing plate, which is fastened by centring in an orifice provided in the cylinder housing, the variably timed transmission comprising a transmission shaft including coupling means for coupling the said transmission shaft to a shaft of the first or second crankshaft line, an end of the said transmission shaft displaying external splines, while the shaft of the second crankshaft is provided with a means with a hollow with internal splines adapted for co-operating with the external splines of the transmission shaft to ensure the coupling of the transmission shaft to the shaft of the second crankshaft line, while still permitting axial displacement between the transmission shaft and the shaft of the second crankshaft line, the variably timed transmission further comprising (a) a sliding tube sliding axially in relation to the axis of rotation of the second crankshaft line, said sliding tube having an outer surface provided with outer helicoidally splines, (b) stop means to limit the travel of the variably timed transmission between a start and an end of travel of the sliding tube, (c) an internal ring with a pair of bearings located between the sliding tube and a fixation piece adapted to be connected to a control moving means controlling the movement of the sliding tube, (d) a sleeve in which the said sliding tube is adapted to slide, said sleeve comprising on its inner periphery helicoidally splines mated to the outer helicoidally splines of the sliding tube;

in which the transmission shaft displays an internal channel for feeding at least one lubricant between the said transmission shaft and the sleeve, in which the variably timed transmission comprises a lubrication system comprising lubricant transfer means selected from the group consisting of channels and passages directly connected to the internal channel of the transmission shaft, and channels and passages indirectly connected to the internal channel of the transmission shaft to feed lubricant to the internal ring extending between the fixation piece and the sliding tube, as well as within at least one channel extending between the transmission shaft and a part of the sliding tube, in which the transmission shaft has a first end, a second end opposite to the first end, and an internal central channel extending in the shaft between said two ends, the first end being directed towards the shaft of the second crankshaft line, while the second end is adjacent to the fixation piece, whereby the second end of the internal central channel adjacent to the fixation piece being sealed;

in which a channel connecting the internal central channel of the transmission shaft to a hollow extending between the sliding tube and an external face of the transmission shaft adjacent to the fixation piece, this channel being adapted to feed lubricant into a chamber of the fixation piece adjacent to the second end of the transmission shaft;

in which a channel extending in the internal ring of the bearings between the chamber of the fixation piece and at least one internal face of the bearings of the internal ring, said channel being adapted to feed lubricant between the pairs of bearings, the lubricant then being able to escape from the bearings of the internal ring;

in which the said lubrication system further comprises at least one passage permitting lubricant to flow out of the variably timed transmission after the passage of the lubricant, at least, through the internal ring extending between the fixation piece and the sliding tube;

in which the said lubrication system is adapted to ensure the flow of lubricant by the centrifugal force created by the rotation of the transmission shaft.

21. The unit of claim 20, wherein for each group of two communicating cylinders of the engine, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane,
wherein said first and second planes define there between an angle between 1° and 60°.

22. The unit of claim 21, wherein said first and second planes define there between an angle between 10° and 50°.

23. The unit of claim 20, wherein for each group of two communicating cylinders of the engine, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane,
wherein said first and second planes define there between an angle between 1° and 60°, and
wherein the axes of the cylinders of each group of two communicating cylinders intersects at a point belonging substantially to a same straight line.

24. The unit of claim 20, wherein for each group of two communicating cylinders of the engine, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane,
wherein said first and second planes define there between an angle between 1° and 60°,
wherein a plane is defined by the axes of rotation of the first and second crankshaft lines, and
wherein a median plane is defined between said first and second planes, the said median plane of a group of cylinders is substantially perpendicular to the plane defined by the axes of rotation of the first and second crankshaft lines.

25. The unit of claim 20, which comprises a camshaft in mesh, at half speed, with the first crankshaft line for ensuring periodic communication of the groups of two communicating cylinders with inlet and exhaust pipes by means of intake and exhaust valves at predetermined moments of the four stroke cycle.

26. The unit of claim 25 wherein a flywheel is mounted on the shaft of the first crankshaft line, while the variably timed transmission is connected to the shaft of the second crankshaft line, and wherein the shafts of the two crankshaft lines are adapted so that the variably timed transmission is located next to the engine flywheel.

27. The unit of claim 20, wherein the control moving means of the variably timed transmission comprises a control jack in direct drive with the fixation piece, to control the phase angle difference between the second crankshaft line and the first crankshaft line.

28. The unit of claim 20, in which the shaft of the second crankshaft line is associated with a bearing journal having internal splines co-operating with the external splines of the transmission shaft.

29. The unit of claim 20, in which for reinforcing the axial rigidity between the shaft of the second crankshaft line and the variably timed transmission, the transmission shaft of the variably timed transmission and the shaft of the second crankshaft line are merged into a single shaft.

30. The unit of claim 20, comprising an engine flywheel which is fixed on the end of the shaft of the first crankshaft line.

31. The unit of claim 30, in which said engine flywheel is located in a coupling housing, while the variably timed transmission is axed on the end of the shaft of the second crankshaft line next to the engine flywheel.

32. The unit of claim 31, which comprises, in the coupling housing, a transmission with gear train between the shaft of the second crankshaft line and the engine flywheel via the variably timed transmission.

33. The unit of claim 20, in which the control moving means for the sliding tube is a control jack controlling the axial displacement of the sliding tube, said control jack being associated with stop means for limiting the displacement between said start and end of travel.

34. The unit of claim 33, in which said control jack is fixed to a support provided on a closing cover of a coupling housing in which the variably timed transmission is located, said coupling housing being located next to an engine flywheel mounted on an end of the shaft of the first crankshaft line.

35. The unit of claim 20, in which the shafts of the first and second crankshaft lines are associated with gears in direct drive, the shafts of the first and second crankshaft lines rotating in opposite directions of rotation and at the same speed, the shafts of the first and second crankshaft lines being each provided with a gear and being coupled to each other by a set of two intermediate coupling gears disposed between the two gears mounted on the shafts of the first and second crankshaft lines, so that they rotate in opposite directions of rotation and at the same speed, while the two intermediate gears located between the said gears mounted on the shafts of the first and second crankshaft lines are arranged and coupled to each side of a plane passing through the axes of the shafts of the first and second crankshaft lines.

36. The unit of claim 20, in which the variably timed transmission comprises a lubrication system comprising at least one channel selected from the group consisting of:
   a channel extending between the central internal channel of the transmission shaft and at least one spline of a coupling end of the transmission shaft;
   a groove extending between the coupling means and the bearing, this groove being suitable to receive the lubricant expelled from the splines during an axial movement within a recess with spline of an end of a camshaft;
   a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
   a channel linking a doughnut-shaped chamber to a doughnut-shaped chamber, intended to feed lubricant to the level of the bearing;
   a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

37. The unit of claim 20, in which the variably timed transmission comprises a lubrication system comprising several channels selected from the group consisting of:
   a channel extending between the central internal channel of the transmission shaft and at least one spline of a coupling end of the transmission shaft;
   a groove extending between the coupling means and the bearing, this groove being suitable to receive the lubricant expelled from the splines during an axial movement within a recess with spline of an end of a camshaft;
   a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
   a channel linking a doughnut-shaped chamber to a doughnut-shaped chamber, intended to feed lubricant to the level of the bearing;
   a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

38. The unit of claim 20, in which the variably timed transmission comprises a lubrication system comprising at least the following channels:
   a channel extending between the central internal channel of the transmission shaft and at least one spline of a coupling end of the transmission shaft;
   a groove extending between the coupling means and the bearing, this groove being suitable to receive the lubricant expelled from the splines during an axial movement within a recess with spline of an end of a camshaft;
   a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
   a channel linking a doughnut-shaped chamber to a doughnut-shaped chamber, intended to feed lubricant to the level of the bearing;
   a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

39. Variably timed transmission for a combustion engine comprising at least an intake phase, a compression phase, an expansion phase and an exhaust phase, said engine operating by an ignition selected from the group consisting of self-ignition and controlled ignition, said combustion engine comprising:

a cylinder housing part having (a) a first series of cylinders, each cylinder of said series having an axis and a diameter, and (b) a second series of cylinders, each cylinder of said series having an axis and diameter, the cylinders of the first series having a volume and a diameter larger than the volume and diameter of the cylinders (3) of the second series, pistons, each piston being adapted to be driven in a reciprocating movement in a cylinder and being associated with a connecting rod, two crankshaft lines having axes of rotation parallel to each other, a first crankshaft line having a crank with a long stroke, while the second crankshaft line has a crank with a short stroke, said short stroke of the crank of the second crankshaft line being less than the long stroke of the crank of the first crankshaft line, said first and second crankshaft lines being adapted to be coupled to the same rotation speed by means of a gear train and a variably timed transmission;

wherein each piston being associated to a connecting rod is operated with a crank of a crankshaft line, the crank with the short-stroke of the second crankshaft line operating the connecting rod of the piston moving in the cylinder of the second series, while the crank with the long-stroke of the first crankshaft line operates the connecting rod of the piston moving in the cylinder of the first series, wherein the first series of cylinders is arranged above the first crankshaft line, while the second series of cylinders is arranged above the second crankshaft line, wherein each cylinder of the first series communicates with at least one cylinder of the second series via a clearance so as to form a group of two communicating cylinders communicating with each other to allow gas passing from one cylinder to the other irrespective of the position of the pistons moving in said two communicating cylinders, the said engine including a fitting for the variably timed transmission, the said fitting being suitable to receive, at least partially, a control unit governing the phase angle difference between the first and second crankshaft lines, the first and second crankshaft lines being associated with a first driving wheel and a second driving wheel respectively, while a driving means extends between the said first and second driving wheels, in which the variably timed transmission comprises an assembly separated from the shaft of the second crankshaft, the variably timed transmission being equipped with a bearing plate, which is fastened by centring in an orifice provided in the cylinder housing, the variably timed transmission comprising a transmission shaft including coupling means for coupling the said transmission shaft to a shaft of the first or second crankshaft line, an end of the said transmission shaft displaying external splines, while the shaft of the second crankshaft is provided with a means with a hollow with internal splines adapted for co-operating with the external splines of the transmission shaft to ensure the coupling of the transmission shaft to the shaft of the second crankshaft line, while still permitting axial displacement between the transmission shaft and the shaft of the second crankshaft line, the variably timed transmission further comprising (a) a sliding tube sliding axially in relation to the axis of rotation of the second crankshaft line, said sliding tube having an outer surface provided with outer helicoidally splines, (b) stop means to limit the travel of the variably timed transmission between a start and an end of travel of the sliding tube, (c) an internal ring with a pair of bearings located between the sliding tube and a fixation piece adapted to be connected to a control moving means controlling the movement of the sliding tube, (d) a sleeve in which the said sliding tube is adapted to slide, said sleeve comprising on its inner periphery helicoidally splines mated to the outer helicoidally splines of the sliding tube;

in which the transmission shaft displays an internal channel for feeding at least one lubricant between the said transmission shaft and the sleeve, in which the variably timed transmission comprises a lubrication system comprising lubricant transfer means selected from the group consisting of channels and passages directly connected to the internal channel of the transmission shaft, and channels and passages indirectly connected to the internal channel of the transmission shaft to feed lubricant to the internal ring extending between the fixation piece and the sliding tube, as well as within at least one channel extending between the transmission shaft and a part of the sliding tube, in which the transmission shaft has a first end, a second end opposite to the first end, and an internal central channel extending in the shaft between said two ends, the first end being directed towards the shaft of the second crankshaft line, while the second end is adjacent to the fixation piece, whereby the second end of the internal central channel adjacent to the fixation piece being sealed;

in which a channel connecting the internal central channel of the transmission shaft to a hollow extending between the sliding tube and an external face of the transmission shaft adjacent to the fixation piece, this channel being adapted to feed lubricant into a chamber of the fixation piece adjacent to the second end of the transmission shaft;

in which a channel extending in the internal ring of the bearings between the chamber of the fixation piece and at least one internal face of the bearings of the internal ring, said channel being adapted to feed lubricant between the pairs of bearings, the lubricant then being able to escape from the bearings of the internal ring;

in which the said lubrication system further comprises at least one passage permitting lubricant to flow out of the variably timed transmission after the passage of the lubricant, at least, through the internal ring extending between the fixation piece and the sliding tube;

in which the said lubrication system is adapted to ensure the flow of lubricant by the centrifugal force created by the rotation of the transmission shaft.

40. The variably timed transmission of claim 39, wherein for each group of two communicating cylinders, the axis of a cylinder of the first series of the group in question forms with a line parallel to the axis of rotation of a first crankshaft line a first plane, while the axis of the cylinder of the second series of the group in question forms with a line parallel to the axis of rotation of the second crankshaft line a second plane, wherein said first and second planes define there between an angle between 1° and 60°.

41. The variably timed transmission of claim 40, wherein the control moving means of the variably timed transmission comprises a control jack in direct drive with the fixation piece, to control the phase angle difference between the second crankshaft line and the first crankshaft line.

42. The variably timed transmission of claim 40, in which for reinforcing the axial rigidity between the shaft of the second crankshaft line and the variably timed transmission, the transmission shaft of the variably timed transmission and the shaft of the second crankshaft line are merged into a single shaft.

43. The variably timed transmission of claim 40, in which the control moving means for the sliding tube is a control jack controlling the axial displacement of the sliding tube, said control jack being associated with stop means for limiting the displacement between said start and end of travel.

44. The variably timed transmission of claim 43, in which said control jack is fixed to a support provided on a closing cover of a coupling housing in which the variably timed transmission is located, said coupling housing being located next to an engine flywheel mounted on an end of the shaft of the first crankshaft line.

45. The variably timed transmission of claim 40, in which the variably timed transmission comprises a lubrication system comprising at least one channel selected from the group consisting of:
- a channel extending between the central internal channel of the transmission shaft and at least one spline of a coupling end of the transmission shaft;
- a groove extending between the coupling means and the bearing, this groove being suitable to receive the lubricant expelled from the splines during an axial movement within a recess with spline of an end of a camshaft;
- a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
- a channel linking a doughnut-shaped chamber to a doughnut-shaped chamber, intended to feed lubricant to the level of the bearing;
- a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

46. The variably timed transmission of claim 40 in which the variably timed transmission comprises a lubrication system comprising several channels selected from the group consisting of:
- a channel extending between the central internal channel of the transmission shaft and at least one spline of a coupling end of the transmission shaft;
- a groove extending between the coupling means and the bearing, this groove being suitable to receive the lubricant expelled from the splines during an axial movement within a recess with spline of an end of a camshaft;
- a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
- a channel linking a doughnut-shaped chamber to a doughnut-shaped chamber, intended to feed lubricant to the level of the bearing;
- a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

47. The variably timed transmission of claim 40, in which the variably timed transmission comprises a lubrication system comprising at least the following channels:
- a channel extending between the central internal channel of the transmission shaft and at least one spline of a coupling end of the transmission shaft;
- a groove extending between the coupling means and the bearing, this groove being suitable to receive the lubricant expelled from the splines during an axial movement within a recess with spline of an end of a camshaft;
- a channel to feed lubricant from the central internal channel towards the end of the sliding tube turned towards the camshaft of the engine, this channel actually feeding lubricant into a doughnut-shaped chamber displaying a doughnut-shaped groove located, at least partially, at a cylindrical level in relation to the axis of the transmission shaft located under the internal cylindrical face of the sliding tube;
- a channel linking a doughnut-shaped chamber to a doughnut-shaped chamber, intended to feed lubricant to the level of the bearing;
- a flared channel for increasing the lubricant's speed, linking the bearing to a distribution chamber distributing lubricant at the level of the bearings of a bearing plate, the distribution chamber displaying an outlet feeding lubricant between a part of the bearing plate and a part of the bearing, lubricant being able to escape from the bearing between the bearing plate and the gearing.

* * * * *